J. R. UECKERT.
RING CHUCK.
APPLICATION FILED APR. 14, 1921.
1,428,868.
Patented Sept. 12, 1922.
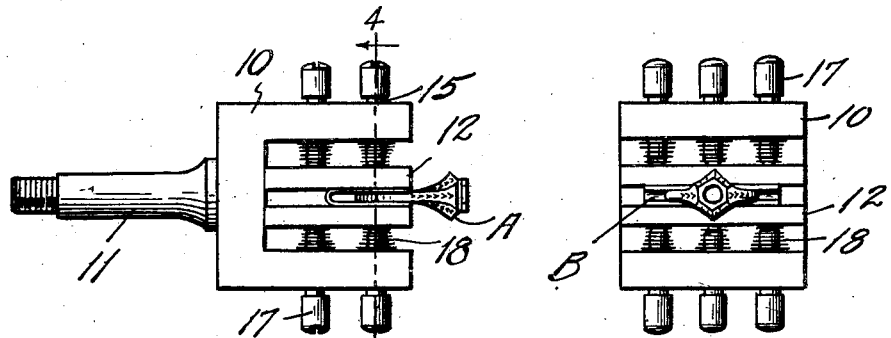
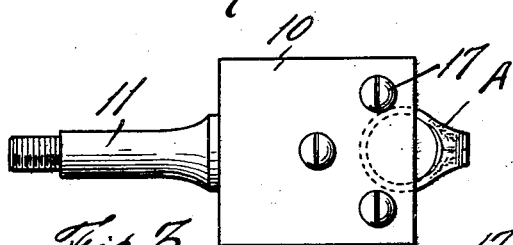
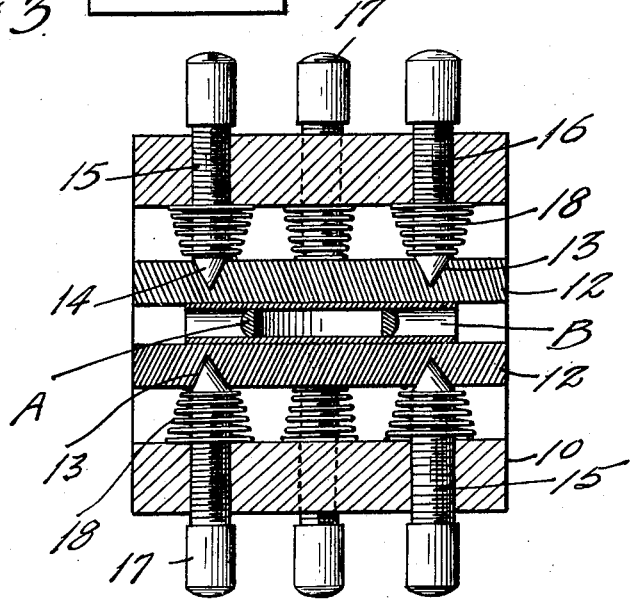
Inventor
J. R. Ueckert
By Jack A. Pehly
Attorney Patented Sept. 12, 1922.

1,428,868

UNITED STATES PATENT OFFICE.

JOHN R. UECKERT, OF DALLAS, TEXAS.

RING CHUCK.

Application filed April 14, 1921. Serial No. 461,404.

*To all whom it may concern:*

Be it known that I, JOHN R. UECKERT, a citizen of the United States, residing at Dallas, in the county of Dallas and State of Texas, have invented certain new and useful Improvements in Ring Chucks, of which the following is a specification.

This invention relates to new and useful improvements in ring chucks.

The object of the invention is to provide a chuck with a clamping element adapted to hold a ring so that the bezel or mounting may be expeditiously and accurately drilled or tooled. A particular object of the invention is to support the ring in the chuck in such a manner that said ring after being clamped, may be adjusted so as to properly position it to be worked upon. Another feature of the invention is to provide a clamping element arranged to receive and support a ring in a semi-rigid position and adapted to be bodily adjusted to position the ring.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is a side elevation of a chuck constructed in accordance with my invention, Fig. 2 is a front elevation of the same, Fig. 3 is an elevation at right angles to Fig. 1, and Fig. 4 is an enlarged cross sectional view taken on the line 4—4 of Fig. 1.

In the drawings the numeral 10 designates a rigid jaw or yoke, exhibiting an angular U-shape in cross section. The jaw is provided with a rearwardly extending central shank 11, which is suitably shaped to be mounted in the head-end of a lathe or other machine having a rotating member. It is to be understood variations may be made in the shape and material of which the jaw is constructed.

Within the opening of the jaw I provide a clamping element including a pair of rectangular plates 12, which preferably have such a size and shape as to conform to the contour of the jaw and to be confined within the same. Each plate is provided in its outer face with counter sunk recesses 13 receiving the reduced ends 14 of adjusting screws 15. The screws 15 are mounted in screw threaded openings 16 in the sides of the jaw. Each screw is provided with a head 17 exteriorly of the jaw. In the drawings I have shown on each side a pair of screws near the front edge of the jaw and spaced apart, with a turn screw disposed relatively between the pair of screws but near the center of the side of the jaw. It is to be understood that the number of screws may be varied as found expedient.

On each screw between the plate 12 and the adjacent side of the jaw, a coiled spring 18 is confined so as to bear against said plate.

It will be seen that the springs will tend to force the plates 12 together. And it is proposed that the recesses 13 shall be deep enough for the points 14 of the screws to at all times project thereinto, thus preventing the displacement of the clamping plates from the jaw. The ring A may be inserted between the front edges of the plates, but it is preferable to wrap a piece of paper or light cardboard B around the ring so as to protect the same. The springs will exert sufficient tension on the plates to clamp the ring, but in order to hold it rigidly in position, the screws 15 must be tightened as is obvious.

In using the device the ring is inserted between the plates as is shown in the drawing. The ring may be adjusted longitudinally of the clamping plates 12 by loosening the screws and oscillating the ring. If it is found necessary to adjust the ring laterally in order to bring it in proper position to receive the wedging tool, it will then be necessary to adjust the clamping plates laterally. This is easily accomplished by backing off the screws 15 on one side, and screwing up the screws 15 on the other side of the jaw. By this arrangement it is possible to adjust the ring to the minutest degree after it has been placed in position in the machine. It will be seen that without the springs 18 the clamping plates would become loose when the screws were loosened and the ring would either fall out or swing out of position. The springs exert enough tension to hold the ring in a semi-rigid position and to keep the plates in position. It is obvious that only a slight adjustment of the screws will be necessary to clamp and release the ring from the clamping element.

Various changes in the dimensions and shape and modifications may be made without departing from the spirit of the invention.

What I claim, is:

1. In a ring chuck, a jaw having a centrally extending shank, a pair of plates loosely mounted within the jaw, a plurality of screws mounted in each side of the jaw and provided with points, said plates having spaced recesses receiving the points of the screws, said plates being adapted to receive and clamp an article therebetween, and coil springs extending between the sides of the jaws and the plates for holding said plates in engagement with an article while they are being shifted and adjusted by the screws.

2. In a ring chuck, a supporting member, a clamping element mounted within the member including separable parts for receiving a ring therebetween, resilient means within the member exerting a clamping pressure upon each side of the clamping element, whereby its separable parts are forced together, and means for fastening the parts of the clamping element in clamping position.

3. In a ring chuck, a supporting member, a clamping element including separable parts for receiving a ring therebetween, resilient means within the member exerting a clamping pressure upon the separable parts of the clamping element, and means for fastening the parts of the clamping element in clamping position, said last named means being adjustable to bodily shift the clamping element within the supporting member.

4. In a ring chuck, a jaw, a pair of clamping plates movably disposed within the jaw, adjusting screws mounted in the jaw engaging the plates, and coiled springs disposed between the plates and the sides of the jaw for holding said plates together.

5. In a ring chuck, a jaw, a pair of clamping plates movably disposed within the jaw, adjusting screws mounted in the side of the jaw, said plates having recesses receiving the ends of the screws, and coiled springs confined on the screws between the sides of the jaw and the plates.

In testimony whereof I affix my signature.

JOHN R. UECKERT.